US007668261B2

(12) United States Patent
Paila

(10) Patent No.: US 7,668,261 B2
(45) Date of Patent: Feb. 23, 2010

(54) METHOD AND APPARATUS FOR SELECTIVE DATA RECEPTION

(75) Inventor: Toni Paila, Koisjäroi (FI)

(73) Assignee: Nokia Corporation, Espoo (FI)

( * ) Notice: Subject to any disclaimer, the term of this patent is extended or adjusted under 35 U.S.C. 154(b) by 421 days.

(21) Appl. No.: 10/561,488

(22) PCT Filed: Jun. 28, 2004

(86) PCT No.: PCT/IB2004/051030

§ 371 (c)(1),
(2), (4) Date: Feb. 22, 2007

(87) PCT Pub. No.: WO2005/002097

PCT Pub. Date: Jan. 6, 2005

(65) Prior Publication Data

US 2008/0036909 A1 Feb. 14, 2008

(51) Int. Cl.
*H04L 27/14* (2006.01)

(52) U.S. Cl. ...................................................... 375/326

(58) Field of Classification Search ................. 375/326, 375/316, 364, 324; 370/241, 229, 401, 473, 370/537, 389; 710/35, 307
See application file for complete search history.

(56) References Cited

U.S. PATENT DOCUMENTS 5,970,069 A * 10/1999 Kumar et al. ............... 370/402
7,142,553 B1 * 11/2006 Ojard et al. ................. 370/421
2005/0044471 A1 * 2/2005 Chia et al. .................. 714/776

FOREIGN PATENT DOCUMENTS

| | | | |
|---|---|---|---|
| EP | 0 967 747 | A2 | 12/1999 |
| EP | 0 967 747 | A3 | 12/1999 |
| EP | 1 253 721 | A2 | 10/2002 |
| EP | 1 253 721 | A3 | 10/2002 |
| WO | WO 02/082834 | A1 | 10/2002 |

* cited by examiner

*Primary Examiner*—Khai Tran
(74) *Attorney, Agent, or Firm*—Locke Lord Bissell & Liddell LLP

(57) ABSTRACT

A terminal 13 for selectively receiving broadcast data in a transport stream 7 over a first network, the broadcast data including a series of bursts of associated data packets (B1), comprises a controller 16 and a receiver 19. The controller 16 is configured to extract information identifying a group of data packets from the data packets within a first burst, e.g. Packet Identifier (PID) PID1, PID2, calculate a burst length and burst interval for the series on the basis of the times at which data packets are received by the receiver and to calculate one or more instances of time $t_s$ at which one or more subsequent bursts in the series will be received based on the calculated burst length $t_{s3}$ and/or burst interval $t_1$. The receiver 19 is operated to selectively receiving the transport stream 7, e.g. by switching the receiver 19 between its on and off states, the receiver 19 being switched on at time $i_s$ for a period equal to the burst length in order to receive subsequent data bursts in the series. The terminal 13 may be further configured to enable mobile telephone communication via a second network.

20 Claims, 4 Drawing Sheets

METHOD AND APPARATUS FOR SELECTIVE DATA RECEPTION

FIELD OF THE INVENTION

The invention relates to the selective reception of data from a broadcast service. The invention is particularly suitable for, but not limited to, IP data broadcasting over unidirectional networks.

BACKGROUND OF THE INVENTION

An Internet protocol (IP) service can include plural items delivered using an IP session. An IP session may include an IP stream carrying primary content, such as live or recorded music, and further IP streams carrying secondary content, such as error correction or song lyrics. Such services can be broadcast in a multiplexed transport stream using terrestrial digital video broadcast, for example DVB-T, ISDB-T or ATSC-T, or DVB-S (satellite), DVB-C (cable) or Digital Audio Broadcasting (DAB) networks.

Wireless IP networks typically serve one or more mobile terminals having stringent power requirements. Such a terminal may be required to operate for lengthy periods on an internal source of power. In the case of simplex broadcast systems supporting unidirectional data delivery, for example DVB-T or DVB-S networks, a large proportion of the power consumption in a terminal is due to the demands of a receiver when receiving data transmissions. It is desirable to conserve power by reducing the amount of data received, i.e. by receiving only selected data.

Selective data reception can be implemented for receiving a particular stream of data in a Time Division Multiple Access (TDMA) transmission by switching the receiver between its on and off states, so that data reception is suspended during time slots relating to services or content that are not required. In our co-pending application, GB0216240.2, a method is disclosed in which a session announcement is transmitted on a first channel in a transport stream. If a service is of interest to a user of the terminal, the information conveyed in the service announcement can be used to control the operation of the receiver in order to selectively receive broadcast or multicast data relating to that service. This information may include the frequency of the broadcast channel carrying a particular service, a description of the service in terms of a category, e.g. news, sport, entertainment, and a sub-category, for example, the sports category may be divided into football, hockey, athletics sub-categories. The information may also include the number of messages containing the relevant content that will be sent and a time out value. When data reception is not required, i.e. when data relating to the selected service is not being transmitted, the receiver is disabled, in order to conserve power.

In another co-pending application, PCT/IB02/04823, a receiver is controlled to selectively receive data using a schedule of delivery time slots, where the schedule is extracted from information relating to the IP address of the content source provided in a session announcement. Tie receiver may be switched off or operated at a lower power between the delivery time slots, when data reception is not required.

The performance of these methods may be improved by grouping related data packets into bursts before their transmission. The transmission takes the form of a sequence of bursts taking up most or all of the available bandwidth for a relatively short period of time, each burst carrying a significant amount of interrelated data. Information relating to the burst duration and the interval between related bursts is encoded into the headers of the data packets in the bursts, while information describing the contents of the burst are signalled using external address mapping functionality provided by the transmission network baseline, such as the network information table (NIT) table in a DVB system. This fisher reduces the period of time for which the receiver is actively receiving data.

SUMMARY OF THE INVENTION

According to the invention, a terminal for selectively receiving broadcast data in a data stream, wherein the broadcast data includes a series of bursts of data packets, comprises a receiver and a controller, wherein the controller is configured to extract information identifying a group of data packets in a first burst, calculate a burst length and burst interval for the series of bursts on the basis of instances of time at which bursts of data packets belonging to said group are received by the receiver, determine a further instance of time at which a subsequent burst corresponding to the extracted information in the series of bursts is expected to be received based on at least one of said burst length and burst interval and operate the receiver to receive the subsequent burst corresponding to the extracted information by selectively receiving the data stream.

As the burst length and burst interval are derived by the controller using the reception times of data bursts, the need to broadcast this information explicitly, for example in the data packet headers or in an external table, is removed. Therefore, in comparison to prior arrangements, a reduced amount of data is transmitted and received. The available bandwidth is used more efficiently and the power consumption of the receiver is reduced.

Address information relating to a source of the data may be included within the bursts or, alternatively, extracted from a session announcement.

Selective reception of the data bursts may be effected by switching the receiver between two operation modes. Preferably, these operation modes are on and off states, so that the receiver power consumption is minimised.

The extraction of information identifying a group of data packets and the calculation of the burst length and the burst interval are preferably performed for each series of associated data bursts in all data streams received by the terminal when the terminal is switched on. However, this procedure may be performed in response to a request for reception of a particular service from a user of the terminal.

The extraction of identifying information from the data packets and the calculation of the burst interval and the burst length may also be repeated at regular intervals and/or in response to notification that a configuration of the data stream has changed.

The invention further provides a system for broadcasting data comprising a multiplexer, a transmitter and one or more of said terminals.

A method of operating a receiver to selectively receive broadcast data in a data stream according to the invention, wherein the broadcast data includes a series of bursts of data packets, comprises extracting information identifying a group of data packets in a first burst, calculating a burst length and burst interval for the series of bursts on the basis of the instances of time at which data packets belonging to said group are received by the receiver, determining a further instance of time at which a subsequent burst corresponding to the extracted information in the series is expected to be received and operating the receiver to receive the subsequent burst corresponding to the extracted information by selectively receiving the data stream.

BRIEF DESCRIPTION OF THE DRAWINGS

Embodiments of the invention will now be described with reference to the accompanying drawings, in which.

DETAILED DESCRIPTION

Figure 1:
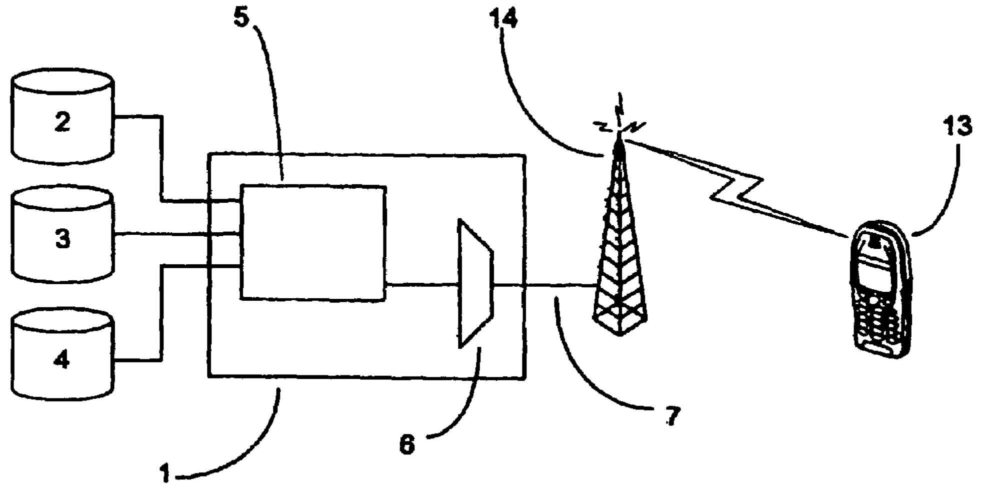
FIG. 1 depicts a communication system according to an embodiment of the invention.

FIG. 1 shows a broadband digital broadcast head-end 1 connected to a variety of sources 2, 3, 4 of content, so that data packets relating to services and/or content, e.g. audio-visual content, data files, images, are delivered to the head-end 1. In this example, these data packets are in the form of IPv4 or IPv6 datagrams. The data packets arc encapsulated by a data processor 5 at the head-end 1 and grouped together into one or more bursts, which have a bandwidth equal to or approaching the maximum bandwidth available to the transport stream, and a relatively short duration. A set of data packets relating to a particular service or the same content are arranged in the same burst or series of bursts, although a single burst may contain a plurality of sets of data packets that are unrelated to each other to ensure efficient use of bandwidth. The bursts are multiplexed by a multiplexer 6 according to a TDMA scheme and transmitted in a transport stream 7 over a DVB network.

Figure 2:
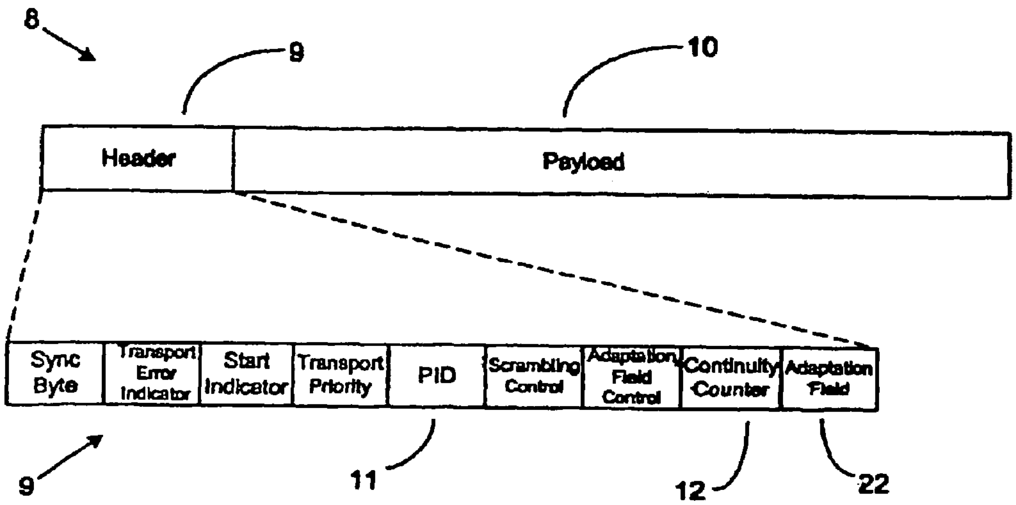
FIG. 2 shows the structure of a transport stream data packet header.

In this example, the transport stream 7 is an MPEG-2 transport stream. The structure of a transport stream data packet 8 is described in "A Guide to MPEG Fundamentals and Protocol Analysis (Including DVB and ATSC)", Tektronix, Inc., USA 1997, and is shown in FIG. 2. The data packet 8 is divided into a header 9 and payload 10. The header 9 includes a packet identifier (PID) 11, used to distinguish between different groups of packets, and a continuity counter 12, which is incremented each time a new packet having the same PID 11 is transmitted so that the received data packets can be assembled in the correct order at their destination.

The transport stream 7 is broadcast to one or more terminals 13. In the case of a satellite network, the transport stream 7 may be broadcast to terminals falling under the satellite footprint. In a terrestrial system, the transport stream 7 is broadcast to terminals 13 that are located within areas of coverage of one or more network transmitters 14. Each terminal 13 is under the control of a user who is able to select a particular service or content from those transmitted in the transport stream 7.

Figure 3:
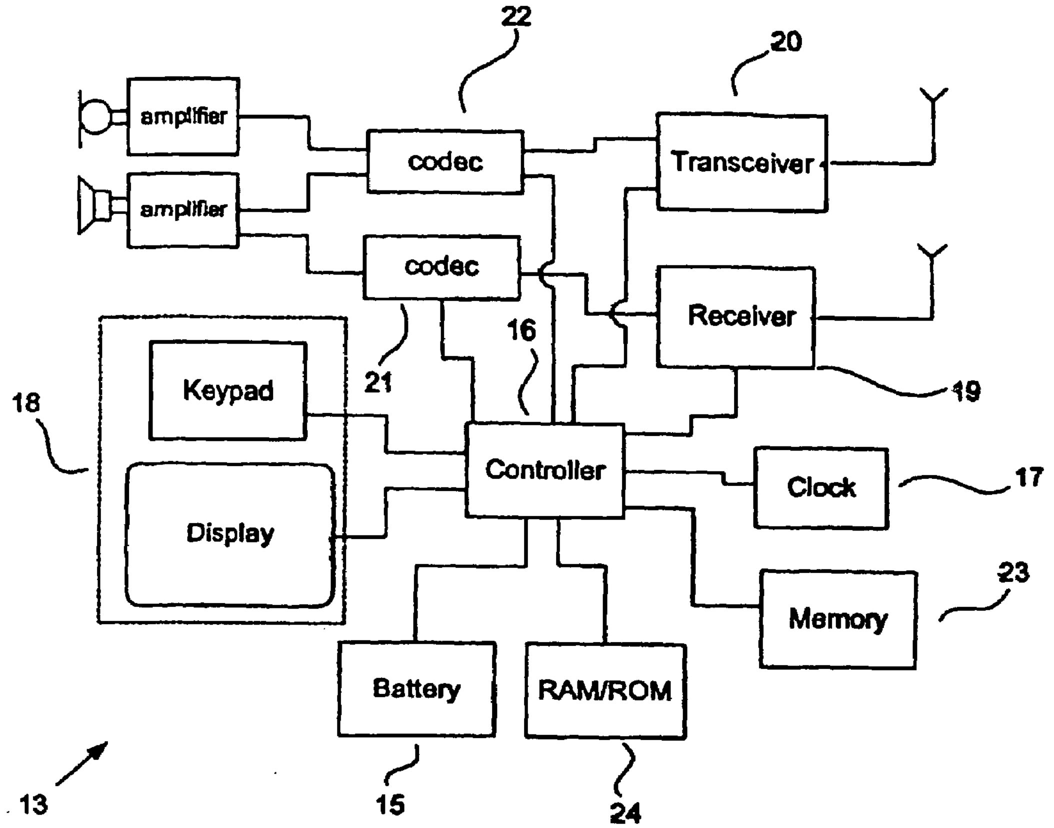
FIG. 3 is a block diagram of a terminal for use in the communication system of FIG. 1.

A suitable terminal 13, which, in this example is a mobile handheld telecommunications device, is shown in detail in FIG. 3 and comprises an internal power supply in the form of a rechargeable battery 15, a controller 16, with an associated clock 17, a user interface 18, a receiver 19, a cellular transceiver 20, codecs 21, 22, memory 23 and a data storage facility 24, such as RAM and/or ROM memory. The receiver 19 is configured to receive the transport stream 7 broadcast over the DVB network while the cellular transceiver 20 enables mobile telephone communication via a cellular network. The receiver 19 has a relatively large power requirement when compared with other components of the terminal 13. In order to minimise drain on the battery 15, the receiver 19 can be switched on and off in response to instructions received from the controller 16.

When the terminal 13 is first switched on, the controller 16 begins compiling a mapping table comprising information such as a Packet Identifier (PID), burst length and burst interval associated with various services transmitted in one or more transport streams 7. In conventional devices, this information would be provided either in the headers of the encapsulated data packets or in a session announcement received separately from the transport stream 7. However, in accordance with the invention, this information is derived by the terminal 13, having been conveyed implicitly by the transport stream 7.

Figure 4:
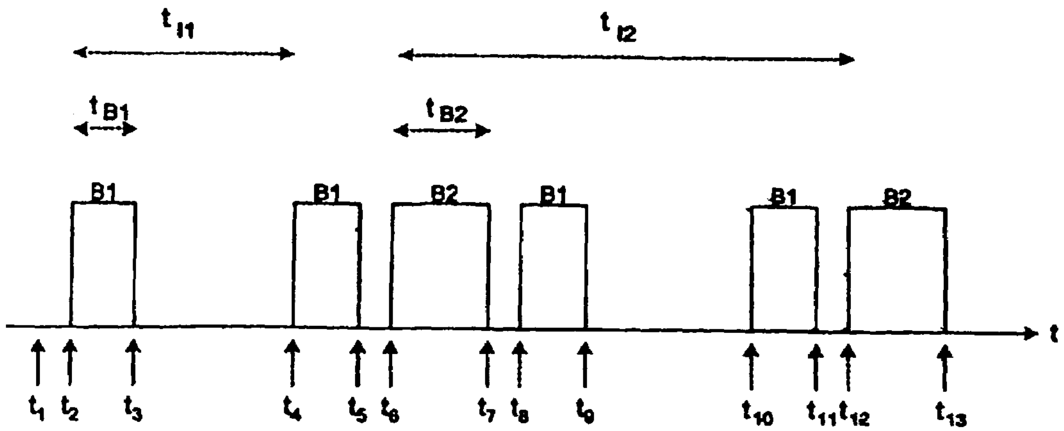
FIG. 4 depicts the transmission of two sets of data bursts in a transport stream.

A procedure for deriving this information will now be described with reference to FIG. 4 and Table 1. FIG. 4 depicts an exemplary transport stream 7 comprising two sets of bursts, with PIDs B1, B2, comprising data packets associated with first and second services respectively. Table 1 shows the information held in the mapping table maintained by the controller 16 during the procedure. In this example, as the mapping table is being compiled in response to the terminal 13 being switched on, it is presumed that a user of the terminal 13 has not yet instructed the terminal to receive either of the first and second services.

TABLE 1

| Time | PID | Interval | Length |
|---|---|---|---|
| $t_1$ | — | — | — |
| $t_3$ | B1 | — | $t_{B1}$ |
| $t_4$ | B1 | $t_{11}$ | $t_{B1}$ |
| $t_7$ | B1 | $t_{11}$ | $t_{B1}$ |
| | B2 | — | $t_{B2}$ |
| $t_{12}$ | B1 | $t_{11}$ | $t_{B1}$ |
| | B2 | $t_{12}$ | $t_{B2}$ |

The receiver 19 is tuned to the baseband of the transport stream 7 at time $t_1$. A first burst of data packets with a first PID B1 is received, beginning at time $t_2$. As there is no information in the mapping table relating to PID B1, the receiver 19 remains switched on. At time $t_3$, the PID of the data packets in the transport stream 7 changes from B1 to another PID (not shown). The receiver 19 detects the change in the PID of the received data and the controller 16 stores a value for the burst length of:

$$t_{B1}=(t_3-t_2),$$

as part of an entry in the mapping table relating to PID B1.

The start of the burst may be detected from a field in the header 9, as shown in FIG. 2, such as the PID field 11 or the adaptation field 22, or from a field in the payload 10, such as a Media Access Control (MAC) field, not shown, or by using s combination of fields in the header 9 and/or in the payload 10. Where the payload 10 comprises data packets with one or more data packet headers and payloads, the start of the burst may be detected using one or more fields or a combination of them from these headers or payloads.

The controller 16 may have access to information regarding the time delay between the 'real' start time of the burst, i.e. the time at which reception of the burst begins at the terminal 13, and the instant of time when the detection of a particular field, e.g. PID field 11, takes place. This information may be used to correct the start time $t_2$ of the burst. Furthermore, the start time $t_2$ may be corrected to take into account possible jitter by introducing a suitable correction term. This correction term may be of the order of 1 to 5 ms. The jitter correction term may be predetermined or it may be determined by the controller 16 based on received data. In a similar way, the end time of the burst $t_3$ may be corrected to take jitter into account by introducing a second correction term of substantially the same size as the jitter correction term and obtained in a similar way.

As the user has not instructed the terminal to receive the first service, when the first of the next burst of data packets with PID B1 is received at time $t_4$, the receiver 19 is switched off for a first time period of $t_{B1}$ in order to conserve battery power. At this point, a value of:

$$t_{I1}=(t_4-t_2),$$

for the interval between bursts for PID B1 is stored in the mapping table. Alternatively, the interval may be defined as the time from the end of the burst to the end of the next burst with the same PID, for example, as:

$$t_{I1}=(t_5-t_3).$$

When time period $t_{B1}$, expires at time$_5$, the receiver 19 is switched on again and continues receiving data.

In this example, a burst of data packets with a PID B2 is received at a time $t_6$. The receiver 19 detects that the PID has changed and, as there is no information relating to PID B2 in the mapping table, remains switched on. When the PID changes at time $t_7$, a value for burst length of:

$$t_{B2}=(t_7-t_6),$$

is stored in the mapping table in an entry relating to PID B2 and the receiver 19 continues receiving the transport stream 7. The start time $t_6$ of the burst with the PID B2 may be corrected for jitter as explained above in relation to start time $t_2$.

As the mapping table now holds the burst length and burst interval for PID B1, the controller 16 will use this information to switch off the receiver 19 during subsequent bursts with this PID, so that no data is received during time periods $t_8$ to $t_9$ and $t_{10}$ to $t_{11}$.

As the user has not requested the second service, when the first of the data packets in a second burst with PID B2 is received at $t_{12}$, the controller 16 ensures that the receiver 19 is switched off for a time period of length $t_{B2}$, ending at time $t_{13}$, and stores a burst interval value:

$$t_{12}=(t_{12}-t_6),$$

in the mapping table for use in receiving subsequent bursts with PID B2.

As this procedure continues, a mapping table is compiled containing the information necessary for the controller 16 to maintain and suspend reception of the transport stream 7. The reception of unwanted data is minimised, thereby reducing the power consumption of the receiver 19. A separate mapping table is compiled for each transport stream 7 received by the terminal 13.

In the above example, the mapping table is compiled in response to the mobile terminal 13 being switched on by a user. However, a terminal 13 may instead be configured so that a mapping table is compiled in response to an instruction from the user for the terminal 13 to receive a service. Such an instruction may result in the terminal 13 sending a request for the service to a relevant service provider. However, in the following example, no such request is sent and the instruction to receive the service is acted on locally, i.e. by the terminal 13 only.

If the user instructs the terminal 13 to receive the second service, the mapping table is compiled as described above, with the exception that the controller 16 ensures that the receiver 19 is switched on at the appropriate times for receiving data packets with PID B2. At time $t_{12}$, the controller 16 calculates the start time $t_s$ of the next data burst associated with PID B2 using the derived burst length $t_{B2}$ and burst interval $t_{12}$, and ensures that the receiver 19 is switched on at time $t_s=t_{12}+t_{12}$for a period equal to the burst length $t_{B2}$. The controller 16 then repeats this process, calculating subsequent start times $t_{sn}=t_{12}+n\ t_{12}$ ($n \geqq 2$) and operating the receiver 19 accordingly, in order to receive subsequent bursts of data packets with PID B2.

In either of the examples discussed above, the derivation of the burst interval and burst lengths may be repeated in order to reduce errors caused by lost data packets. The compilation of the mapping table may also be repeated at regular intervals in order to allow for changes in the configuration of the transport stream 7.

Figure 5:
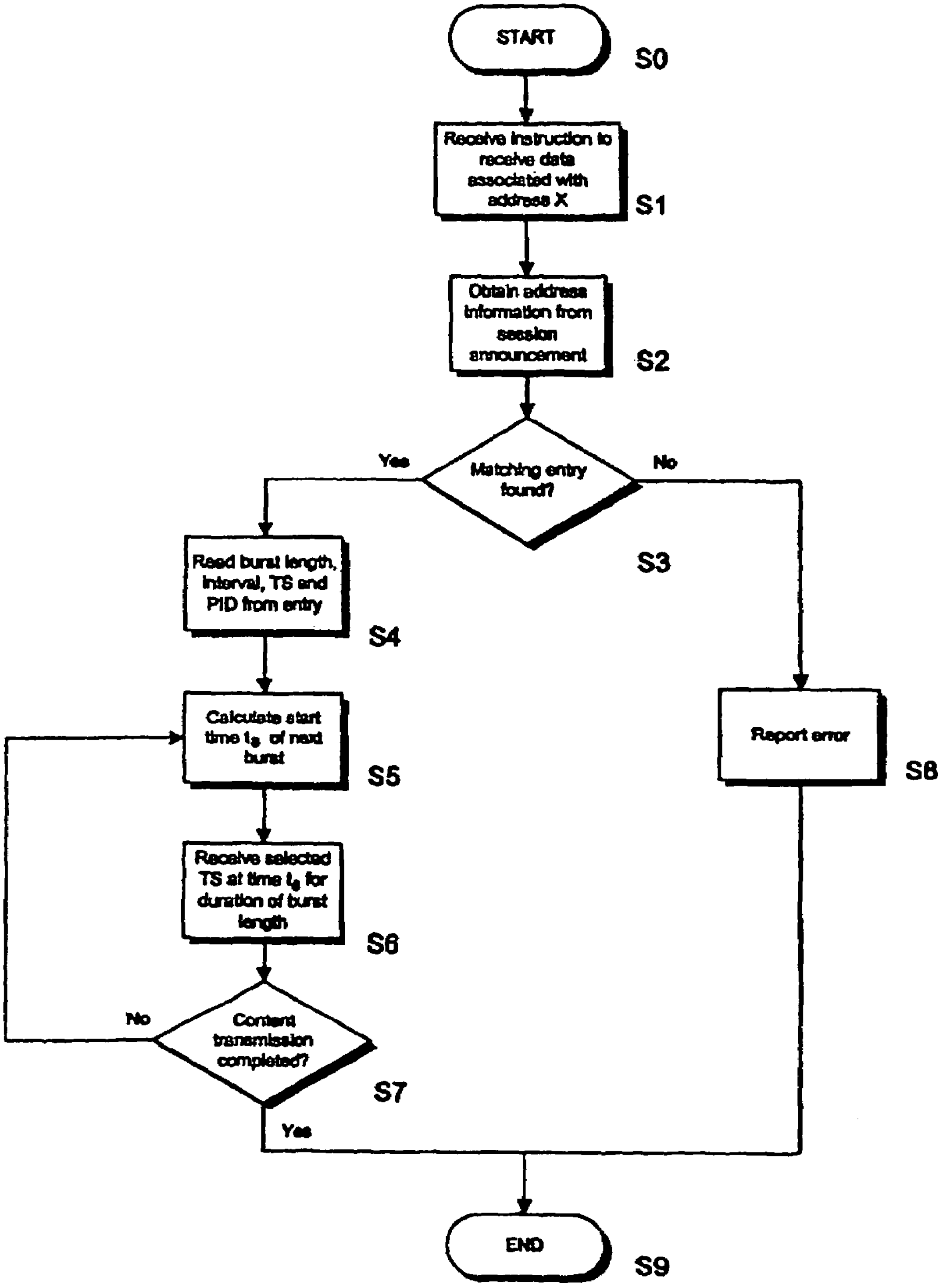
FIG. 5 is a flowchart showing the operation of a receiver according to the first embodiment of the invention.

The transport stream 7 may further include update notifications using data packets with a specified PID 11 that are scheduled with a constant interval and length. The update notifications are used to indicate whether the configuration of the transport stream 7 is changed. Where a change has been made, the controller 16 may respond to the reception of the update notification by recompiling the mapping table.

Where the mapping table is compiled in response to the terminal 13 being switched on, an instruction from a user to receive a particular service is handled as follows. With reference to FIG. 5 and starting at step s0, on reception of an instruction (step s1), the controller 16 obtains an IP address associated with an originating source of that service or an address mapping along with the PID and information identifying the relevant transport stream 7 (step s2). An address mask may be used instead of a single unique IP address, in particular where the burst comprises data packets associated with multiple IP addresses. For example, an address mask 224.1.1.0/8 can be used to indicate 256 addresses in the range 224.1.1.0 to 224.1.1.255. For example, this information could be extracted from a session announcement message transmitted to the terminal 13.

The controller 16 then accesses its mapping tables and determines whether they contain an entry corresponding to that service (step s3). If so, the controller 16 reads the entry associated with that service from its mapping tables in order to extract the burst length and interval (step s4). A start time $t_s$ for the next burst is calculated (step s5), based on the current time, burst length and interval. The receiver 19 is then tuned to the appropriate transport stream 7 at time $t_s$ (step s6) and bursts of data packets with the relevant PID are received and are filtered using the relevant address or address mapping. The controller 16 uses the burst length and interval to suspend reception by switching off the receiver 19 to avoid receiving and processing unwanted data packets.

If transmission of the content or service has not been completed (step s7), the process is repeated by calculating the start time $t_s$ of the next burst and tuning the receiver 19 to the transport stream 7 at the appropriate time (steps s5, s6). When the transmission has been completed, the PID of data packets received at the next calculated start time $t_s$ will not match that given in the mapping table. The change in PID will indicate completion of the transmission of the required content (step s7) and the receiver 19 is switched off.

If the mapping tables do not contain a corresponding entry, an error may be reported to the user via the user interface 18 (step s8). Alternatively, the mapping table compilation process described above may be repeated in order to derive the burst length and burst interval data associated with the requested service.

The process is then complete (step s9).

Figure 6:
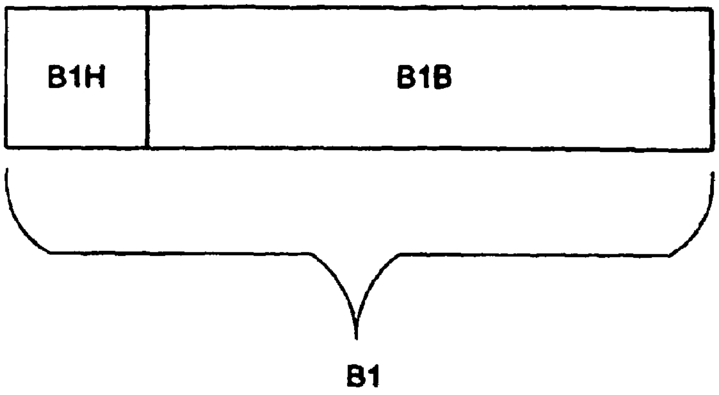
FIG. 6 shows the structure of a data burst for reception by a receiver according to a second embodiment of the invention.

In a second embodiment of the invention, address information is provided within the data packets of transport stream 7, removing the need for an external source of address information. With reference to FIG. 6, a burst of data packets with PID B1 comprises two portions. The data packets of the first portion B1H contain the address mappings of the source IP addresses of the data packets in the second portion B1B, so that the receiver 19 can filter the received data packets to extract the requested service.

Again referring to FIG. 4, in this embodiment, the procedure for compiling the mapping table is similar to that described above, differing in that the source IP addresses, address masks or address mappings are also stored in the mapping table. The addresses are obtained by the controller 16 when the first data burst with a given PID is received. Table 2 shows the information stored in the mapping table at various stages in the transmission as shown in FIG. 4.

Figure 7:
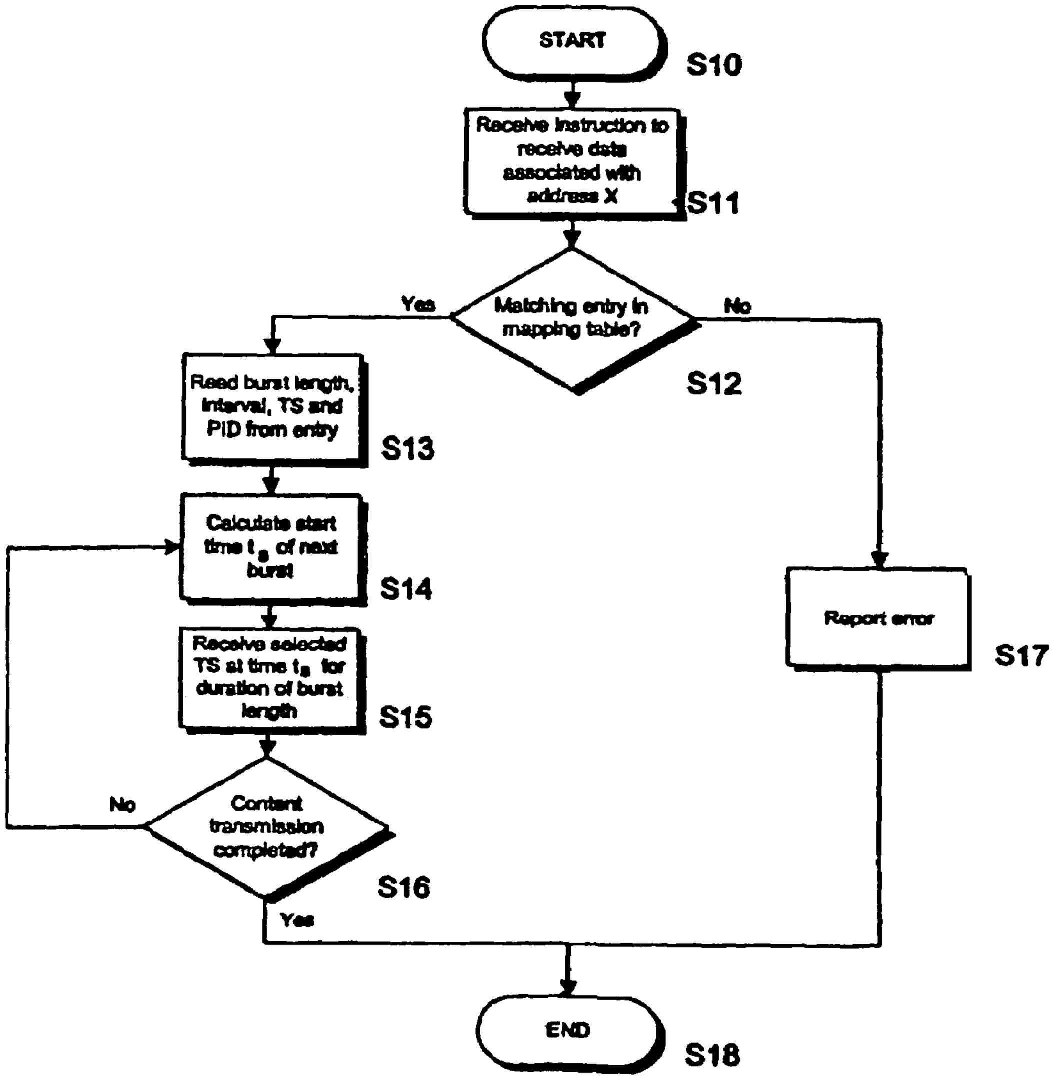
FIG. 7 is a flowchart showing the operation of a receiver according to a third embodiment of the invention.

In this embodiment, the terminal 13 responds to an instruction to receive for a particular service as follows. With reference to FIG. 7 and starting at step s10, on reception of an instruction (step s11), the controller 16 accesses its mapping tables

TABLE 2

| Time | PID | Interval | Length | Address/Mask |
|---|---|---|---|---|
| $t_1$ | — | — | — | — |
| $t_3$ | B1 | — | $t_{B1}$ | known |
| $t_4$ | B1 | $t_{11}$ | $t_{B1}$ | known |
| $t_7$ | B1 | $t_{11}$ | $t_{B1}$ | known |
| | B2 | — | $t_{B2}$ | known |
| $t_{12}$ | B1 | $t_{11}$ | $t_{B1}$ | known |
| | B2 | $t_{12}$ | $t_{B2}$ | known |

and determines whether they contain an entry corresponding to that service (step s12). If so, the controller 16 reads the address or address mapping, burst length and interval from that entry (step s13). A start time $t_s$ for receiving the data is then calculated (step s14), based on the current time, burst length and interval. The receiver 19 is then tuned to the appropriate transport stream 7 at time $t_s$ (step s15) and a burst of data packets with the relevant PID is received and filtered using the relevant address or address mapping. The controller 16 uses the burst length and interval to suspend reception by switching off the receiver 19 to avoid receiving and processing unwanted data packets.

If the data transmission has not yet been completed (step s16), the start time $t_s$ for the next burst is calculated and receiver 19 is tuned to the transport stream 7 to selectively receive the next burst (steps s14, s15). When the data transmission has been completed (step s16), as indicated by the change in PID 11 of the received data packets, the receiver 19 is switched off.

If the mapping tables do not contain a corresponding entry, an error may be reported to the user via the user interface 18 (step s15).

The process is then complete (step s16).

The embodiments described above are examples showing how the invention may be implemented. For example, instead of being switched between on and off states, selective data reception may be implemented by switching the receiver between high and low power operating modes.

The invention is not limited to mobile terminals 13 and other forms of receiving device may be suitable for implementing the invention.

With the example given, the receiver may be any one with DVB, ISDB or ATSC is baseband capability, such as a suitably equipped laptop computer. Where a network other than DVB-T is used, the receiver may take any suitable form, such as a personal digital assistant (PDA) or a portable sound reproduction device, such as a personal stereo. Alternatively, the receiver could be a wireless local area network (WLAN) module.

The invention claimed is:

1. An apparatus, comprising:

a receiver configured to receive broadcast data in a data stream, wherein the broadcast data includes a series of bursts of associated data packets; and a controller;

wherein the controller is configured to:

extract information identifying a group of data packets from the data packets within a first burst;

calculate a burst length and burst interval for the series on the basis of the instances of time at which data packets are received by the receiver;

determine a further instance of time at which a subsequent burst corresponding to the extracted information in the series is expected to be received based on at least one of said burst length and burst interval; and operate the receiver to receive the subsequent burst corresponding to the extracted information by selectively receiving the data stream.

2. An apparatus according to claim 1, wherein address information relating to a source of the broadcast data is included within the bursts.

3. An apparatus according to claim 1, wherein address information relating to a source of the broadcast data is extracted from a session announcement.

4. An apparatus according to claim 1, wherein the extraction of information identifying a group of data packets and the calculation of the burst length and the burst interval are performed in response to a request for reception of a particular service.

5. An apparatus according to claim 1, wherein the controller is configured to operate the receiver to selectively receive the subsequent bursts by switching the receiver between two operation modes.

6. An apparatus according to claim 5, wherein the two operation modes are on and off states.

7. An apparatus according to claim 1, wherein the controller is configured to repeat the extraction of identifying information from the data packets and the calculation of the burst interval and the burst length at regular intervals.

8. An apparatus according to claim 1, wherein the controller is configured to repeat the steps of extracting identifying information from the data packets and calculating burst interval and burst length in response to notification that a configuration of the data stream has changed.

9. An apparatus according to claim 1, wherein the receiver is configured to receive a data stream broadcast over a first network, further comprising means for enabling communication over a second network.

10. An apparatus according to claim 9, wherein the second network is a cellular telecommunications network.

11. A communication system for broadcasting data, comprising:

a multiplexer;

a transmitter;

a communication network; and a terminal according to claim 1.

12. A method of operating a receiver to selectively receive broadcast data in a data stream, wherein the broadcast data includes a series of bursts of associated data packets, comprising:

extracting information identifying a group of data packets from the data packets within a first burst;

calculating a burst length and burst interval for the series on the basis of the instances of time at which data packets are received by the receiver;

determining a further instance of time at which a subsequent burst corresponding to the extracted information in the series is expected to be received; and operating the receiver to receive the subsequent burst corresponding to the extracted information by selectively receiving the data stream.

13. A method according to claim 12, further comprising extracting address information relating to a source of the broadcast data from data packets within a burst.

14. A method according to claim 12, further comprising extracting address information relating to a source of the broadcast data from a session announcement.

15. A method according to claim 12, wherein the extracting of information identifying a group of data packets and the calculating of the burst length and the burst interval are performed in response to a request for reception of a particular service.

16. A method according to claim 12, wherein the receiver is operated to selectively receive the subsequent burst by switching the receiver between two operation modes.

17. A method according to claim 16, wherein the two operation modes are on and off states.

18. A method according to claim 12, wherein the extracting of identifying information from the data packets and the calculating of the burst interval and the burst length are repeated at regular intervals.

19. A method according to claim 12, further comprising repeating the extracting of identifying information from the data packets and the calculating of the burst interval and the burst length in response to notification that a configuration of the data stream has changed.

20. A computer program product, comprising: a computer readable storage medium having recorded thereon computer executable program code, which when executed by a controller, causes an apparatus to perform a method according to claim 12.

* * * * *